US006818815B2

(12) United States Patent
Cohen

(10) Patent No.: US 6,818,815 B2
(45) Date of Patent: Nov. 16, 2004

(54) PHONOGRAPH TURNTABLE WITH MIDI OUTPUT

(75) Inventor: Laurent Cohen, Ft. Lauderdale, FL (US)

(73) Assignee: Stanton Magnetics Inc., Boynton Beach, FL (US)

( * ) Notice: Subject to any disclaimer, the term of this patent is extended or adjusted under 35 U.S.C. 154(b) by 252 days.

(21) Appl. No.: 10/139,442

(22) Filed: May 6, 2002

(65) Prior Publication Data

US 2003/0206506 A1 Nov. 6, 2003

(51) Int. Cl.[7] .................................................. G01H 7/00

(52) U.S. Cl. ....................................... 84/645; 369/47.23

(58) Field of Search .......................... 84/645; 369/47.23

(56) References Cited

U.S. PATENT DOCUMENTS

| | | | | | |
|---|---|---|---|---|---|
| 2,142,591 | A | * | 1/1939 | Ross | 369/272 |
| 4,300,225 | A | * | 11/1981 | Lambl | 369/2 |
| 5,159,143 | A | * | 10/1992 | Emi et al. | 84/645 |
| 5,350,882 | A | * | 9/1994 | Koguchi et al. | 84/636 |
| 5,675,557 | A | * | 10/1997 | Hubinger | 369/4 |
| 6,379,244 | B1 | * | 4/2002 | Sagawa et al. | 463/7 |
| 6,535,462 | B1 | * | 3/2003 | Liu | 369/4 |
| 6,541,690 | B1 | * | 4/2003 | Segers, Jr. | 84/605 |
| 6,545,953 | B1 | * | 4/2003 | Herbert | 369/4 |
| 6,576,825 | B2 | * | 6/2003 | Yamada et al. | 84/602 |
| 6,618,329 | B2 | * | 9/2003 | Liu | 369/4 |
| 2003/0029305 | A1 | * | 2/2003 | Kent et al. | 84/645 |

OTHER PUBLICATIONS

EJ Enterprises, Jul. 25, 2003, "EJ MIDI Turntable Can Now Scratch Video with Edirols's DV-7" http://namm.harmony-central.com/.*

* cited by examiner

*Primary Examiner*—Jeffrey W Donels
(74) *Attorney, Agent, or Firm*—Pitney Hardin LLP

(57) ABSTRACT

The apparatus is a turntable assembly which includes a rotary turntable platter, a phonographic cartridge, and a tonearm for impinging the phonographic cartridge against a record on the rotary turntable platter. The record includes MIDI timing signals encoded therein. The apparatus further includes an amplifier, an analog-to-digital converter and a signal processing means for amplifying the resulting phonographic signal, converting the phonographic signal into digital format and extracting the timing signal so as to generate an output MIDI timing code for controlling the playback of an external audio signal.

5 Claims, 2 Drawing Sheets

PHONOGRAPH TURNTABLE WITH MIDI OUTPUT

BACKGROUND OF THE INVENTION

1. Field of the Invention

The present invention relates to a turntable-type device with a MIDI (Musical Instrument Digital Interface) output. More particularly, the turntable-type device generates MIDI control information which includes a MIDI time code. Therefore, an operator can use standard turntable techniques to alter the playback sequence of either a live or recorded audio performance on a computer or musical device with a MIDI interface.

2. Description of the Prior Art

A MIDI controller is a device that allows a musician a number of ways to create or alter either live or recorded musical performances. These controllers come in various forms such as piano style electronic MIDI keyboards, MIDI electronic violins or wind instruments.

Currently, there is no way for disk jockeys or "turntablists" to directly affect musical performances through a standard interface such as a MIDI. Disk jockeys can affect musical performances only by directly mechanically manipulating the vinyl record on the turntable or by using a device such as "Final Scratch" (by "In2it").

SUMMARY AND OBJECTS OF THE INVENTION

It is therefore an object of the present invention to provide a way for disk jockeys or "turntablists" to directly affect music performances through a standard interface such as a MIDI.

It is therefore a further object of the present invention to provide such a MIDI interface which is controlled in ways which are familiar to disk jockeys or "turntablists", such as a turntable, and which can lead to similar or analogous sonic results.

These and other objects are achieved by providing a phonographic turntable with a MIDI output. The turntable includes a standard platter, motor, phonographic cartridge/needle and tone arm. Furthermore, the phonographic turntable plays a vinyl record which includes a recorded audio time code, typically in analog format. The analog signal which is produced by the phonographic cartridge/needle impinging against the rotating vinyl record is processed by an RIAA preamplifier and an analog-to-digital converter. The digital data output stream from the analog-to-digital converter is fed to a microprocessor or a digital signal processor which interprets the data and extracts timing information in order to produce MIDI time code. Furthermore, the microprocessor or digital signal processor can interpret variation in the data stream as MIDI control messages. The resulting MIDI data stream is sent to a MIDI output. Furthermore, the apparatus can optionally have two MIDI outputs, one for MIDI time code and one for standard MIDI. Additionally, the turntable can include a volume control knob, pitch adjustment slider or similar controls and signals from the volume control knob or similar controls would be encoded into the data stream resulting in MIDI volume control messages. The MIDI time code signals and related signals are used to control the playback of a live or recorded audio performance which may be stored on a device such as a MIDI keyboard or computer.

With this apparatus, the disk jockey or "turntablist" can use standard manual techniques to vary the rotation of the record as the phonographic needle/cartridge impinges against the record thereby generating MIDI time code signals and related signals which control the playback of an audio performance thereby creating sonic effects similar to those which would be created by the same standard manual techniques with a conventional turntable and a conventional record upon which the audio performance is recorded.

BRIEF DESCRIPTION OF THE DRAWINGS

Further objects and advantages will become apparent from the following description and claims and from the accompanying drawings, wherein:

DETAILED DESCRIPTION OF THE PREFERRED EMBODIMENT

Figure 1:
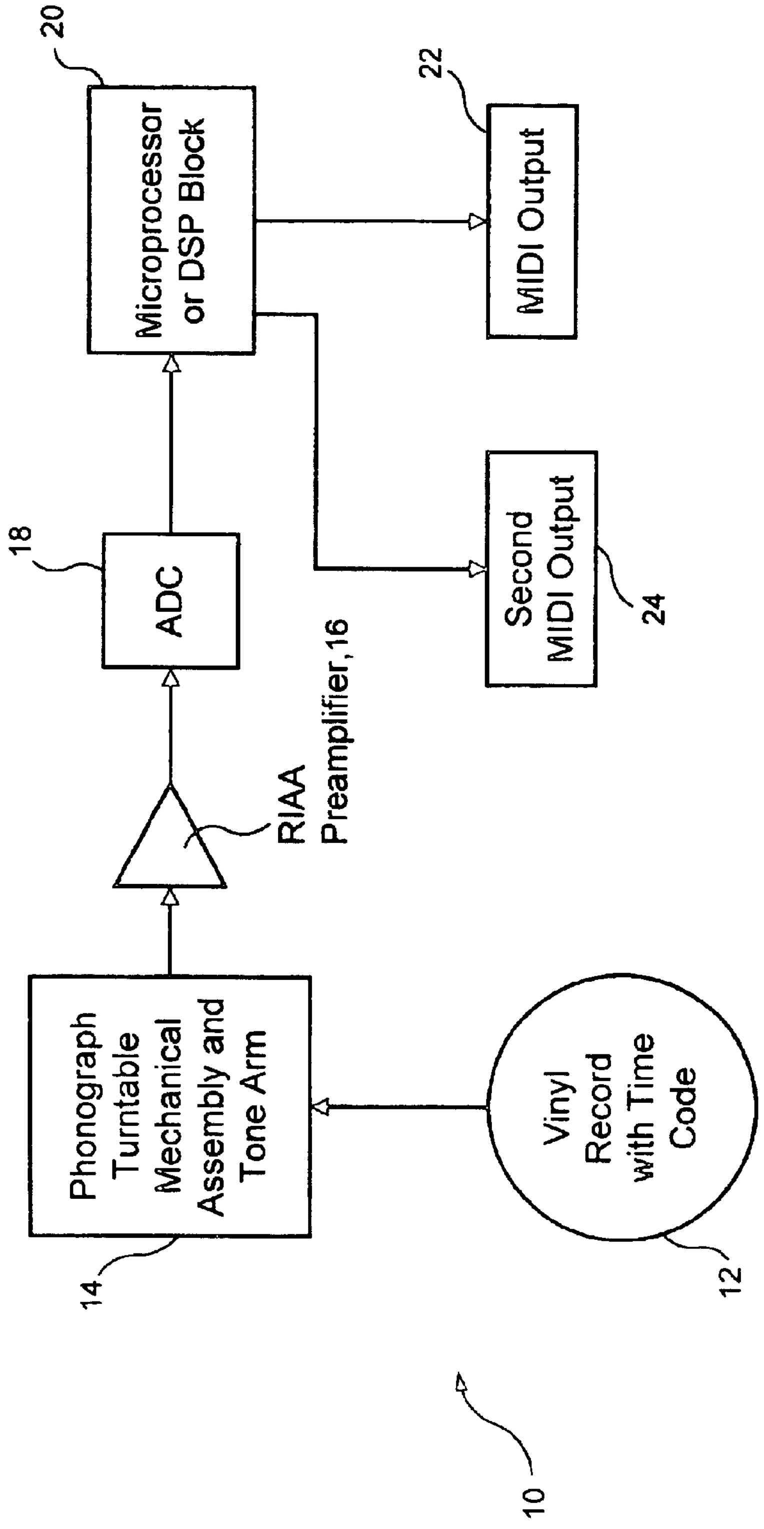
FIG. 1 is a schematic of the electronics of the turntable with MIDI output of the present invention.

Referring now to the drawings in detail wherein like numerals indicate like elements throughout the several views, one sees that FIG. 1 is a schematic of the turntable assembly 10 of the present invention.

A record 12, typically in the format of a vinyl record or a record made from similar material, is provided. Record 12 typically has the appearance of a twelve inch, 33⅓ rpm vinyl record with a spiral groove. However, the groove of record 12, rather than having a musical performance in analog format, has a MIDI audio time code encoded therein in analog format.

Turntable 14 includes typical turntable components such as a platter 15 (see FIG. 2) upon which record 12 is placed, a motor to drive the platter at 33⅓ rpm, a phonographic cartridge/needle 17 which is inserted into the spiral groove of record 12 during playback, and a tonearm 19 for supporting the phonographic cartridge/needle 17. Turntable 14, therefore, generates analog output from record 12 in a way which is largely conventional, except that the resulting analog signal from record 12 includes an analog MIDI audio time code. Furthermore, turntable 14 can include such controls as a volume control or a pitch slider, and information from these controls can be encoded into the analog output from turntable 14. The analog output from turntable 14 is received by RIAA (Recording Industry Association of America) preamplifier 16 in order to amplify the analog signal. RIAA preamplifier 16 is required for this application, just as it is required for playback of conventional LP records, due to the low output level of the phonographic cartridge needle. RIAA preamplifier 16 typically can be chosen from the prior art.

The analog output of RIAA preamplifier is received by analog-to-digital converter 18 for conversion into a digital data stream. The digital data stream output from analog-to-digital converter is received by microprocessor or digital signal processor 20. Microprocessor or digital signal processor 20 interprets the digital data stream and extracts timing information in order to produce MIDI time code and also interprets variations in the digital data stream as MIDI control messages. Furthermore, microprocessor or digital signal processor 20 can extract other MIDI control signals, such as volume changes or pitch changes, from the data stream.

Figure 2:
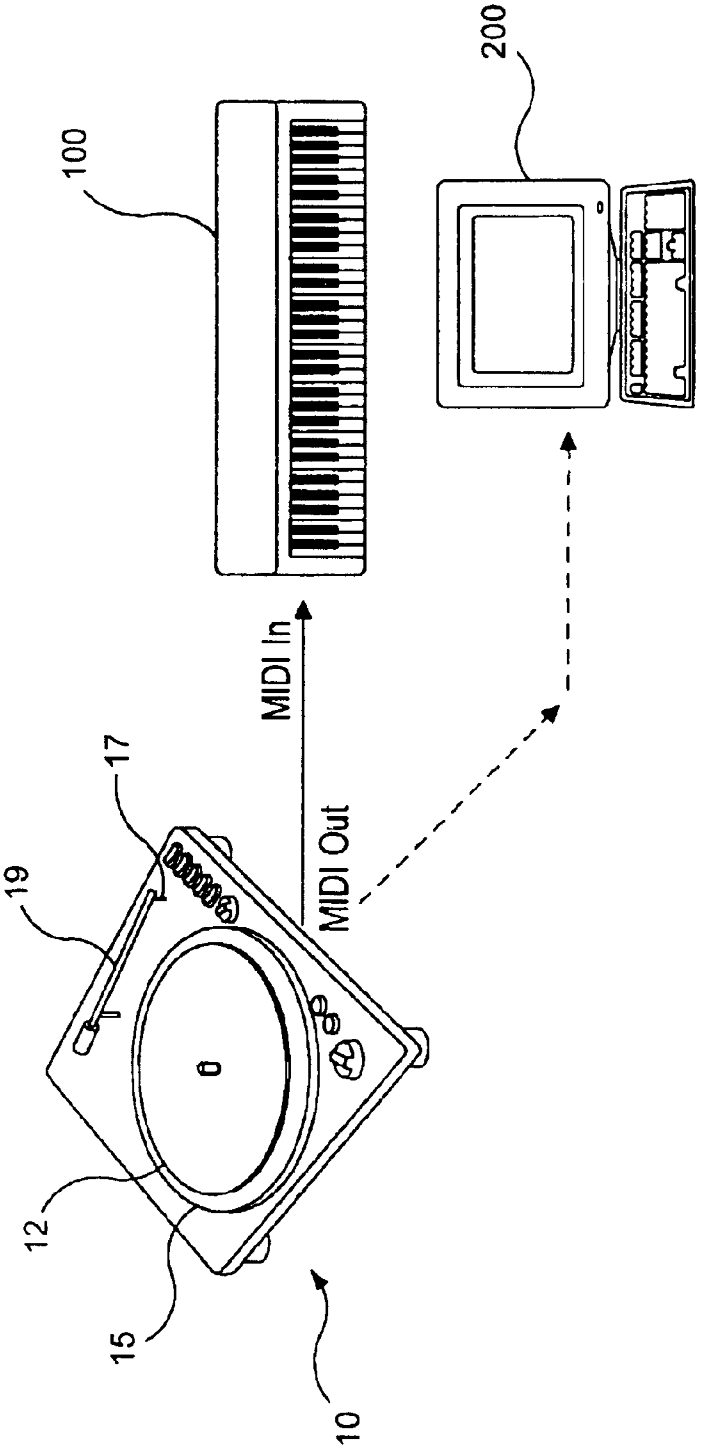
FIG. 2 is a schematic, partially in perspective, of the turntable with MIDI output of the present invention controlling a MIDI instrument, such as a MIDI keyboard or a computer with a MIDI interface.

The resulting MIDI control signals are communicated to MIDI output 22. As shown in FIG. 2, these MIDI control signals are communicated from MIDI output 22 of turntable assembly 10 to MIDI input 26 of an external MIDI device such as MIDI keyboard 100 or computer 200. Many other external MIDI devices could be substituted for keyboard 100 or computer 200, such as a MIDI electronic violin or wind instrument, or an external MIDI device which is communicating a live performance.

Additionally, microprocessor or digital signal processor 20 can be configured to recognize when a conventional analog record, typically including a musical or other audio performance and not including any encoded MIDI information, is being played by turntable 14. The resulting conventional MIDI output is then output from second MIDI output 24.

With turntable assembly 10 operating with record 12 which includes the encoded MIDI audio time code, MIDI control signals are communicated from MIDI output 22 to control the playback of a musical or other audio performance which is being communicated by the external MIDI device, such as electronic keyboard 100 or personal computer 200. With this configuration, a disk jockey or "turntablist" can perform standard manual techniques, such as vigorously and quickly moving the record 12 backward and forward, and have similar or analogous distortions or repetitions occur in the music or audio performance which is communicated by the external MIDI device.

Thus the several aforementioned objects and advantages are most effectively attained. Although a preferred embodiment of the invention has been disclosed and described in detail herein, it should be understood that this invention is in no sense limited thereby and its scope is to be determined by that of the appended claims.

What is claimed is:

1. A turntable assembly, including:

a record including phonographically readable timing signals encoded therein;

a turntable which includes a rotary platter and means for reading said record upon said rotary platter and generating a phonograph signal in accordance therewith;

an amplifier for amplifying said phonograph signal;

an analog to digtal converter receiving input from said amplifier and generating digital output;

signal processing means responsive to said digital output and generating an output signal in MIDI format for controlling timing of playback of an external audio signal; and wherein said record includes a spiral groove and wherein said phonographically readable timing signals are analog signals encoded in said spiral groove.

2. The turntable assembly of claim 1 wherein said output signal from said signal processing means further includes control signals for altering the external audio signal.

3. The turntable of claim 2 wherein said control signals include volume control signals.

4. The turntable of claim 2 wherein said control signals include tonal control signals.

5. The turntable of claim 2 wherein said control signals are determined by manual inputs.

* * * * *